(12) United States Patent
Stephanson (10) Patent No.: US 8,548,765 B2
(45) Date of Patent: Oct. 1, 2013

(54) DYNAMICALLY SELF-ADJUSTING SENSOR

(75) Inventor: Cory James Stephanson, La Selva Beach, CA (US)

(73) Assignee: Broadband Discovery Systems, Inc., Scotts Valley, CA (US)

( * ) Notice: Subject to any disclaimer, the term of this patent is extended or adjusted under 35 U.S.C. 154(b) by 382 days.

(21) Appl. No.: 12/961,273

(22) Filed: Dec. 6, 2010

(65) Prior Publication Data
US 2012/0143550 A1 Jun. 7, 2012

(51) Int. Cl.
*G06F 19/00* (2011.01)
*G01K 11/02* (2006.01)

(52) U.S. Cl.
USPC ............. 702/103; 324/227; 702/85; 702/104

(58) Field of Classification Search
USPC .... 702/85, 92, 94, 103, 104, 115; 73/152.22; 324/227, 244, 260
See application file for complete search history.

(56) References Cited

U.S. PATENT DOCUMENTS

| 5,182,514 | A | * | 1/1993 | Rice, Jr. | ......................... | 324/244 |
| 8,115,480 | B2 | * | 2/2012 | Masubuchi et al. | ........... | 324/227 |

* cited by examiner

*Primary Examiner* — John H Le (57) ABSTRACT

A dynamically self-adjusting sensor is disclosed. In one embodiment, a sample module repeatedly generates an electronic signal related to a characteristic of an environment. A window module receives the electronic signal and provides an average signal for a pre-defined number of the electronic signals. A delta comparator module receives the electronic signal from the sample module and compares the electronic signal with a previously received electronic signal from the sample module to establish a change, wherein an output is generated if the change is greater than or equal to a threshold, the delta comparator module further receives the average signal from the window module and compares the average signal with a previously received average signal from the window module to establish an average change, wherein the output is generated if the change is greater than or equal to a threshold.

18 Claims, 6 Drawing Sheets

DYNAMICALLY SELF-ADJUSTING SENSOR

TECHNICAL FIELD

The field of the present invention relates to a dynamically self-adjusting sensor.

BACKGROUND

Presently, sensors are utilized in numerous environments and products. Moreover, sensors are employed for numerous purposes including, safety, defense, detection, environment monitoring and the like.

In addition, sensors are sophisticated in operation, calibration and even maintenance. As such, training personnel in the operation of sensors including application, the proper methodology of use, calibration and repair is a significant investment in time, training and cost. Moreover, if the sensor is miss-calibrated, improperly installed, incorrectly located, or the like, detection capabilities of the sensor can become significantly reduced.

For example, an out of calibration, miss-calibrated or improperly located sensor can result in a false positive with respect to a failure. In addition, the false positive may result in the shutdown of an otherwise properly functioning system. In most cases, the shutdown of a properly functioning system can result in costs that are many times greater than the cost of fixing or replacing the miss-calibrated or improperly located sensor.

However, a second problem with a false positive from a sensor is that it is usually better to err on the side of caution and shut down the system than risk the loss of functionality or even the destruction of the system being monitored. Thus, even if a user felt certain that the sensor was providing an erroneous false positive, numerous liability issues would prompt the user to shut down the system for inspection and/or repair.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A dynamically self-adjusting sensor is disclosed. In one embodiment, a sample module repeatedly generates an electronic signal related to a characteristic of an environment. A window module receives the electronic signal and provides an average signal for a pre-defined number of the electronic signals. A delta comparator module receives the electronic signal from the sample module and compares the electronic signal with a previously received electronic signal from the sample module to establish a change, wherein an output is generated if the change is greater than or equal to a threshold, the delta comparator module further receives the average signal from the window module and compares the average signal with a previously received average signal from the window module to establish an average change, wherein the output is generated if the change is greater than or equal to a threshold.

DESCRIPTION OF THE DRAWINGS

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview

A dynamically self-adjusting sensor is described. In one embodiment, the dynamically self-adjusting sensor is well suited to stand-alone operation as well as integration with legacy/future technology. In general, the sensor may be optical, magnetic, acoustic and the like.

In general, dynamically self-adjusting refers to the sensor's ability to calibrate for change in environmental monitored characteristics. In other words, the capability to adjust to changes in monitored conditions without requiring manual recalibration of the sensor, disconnection of the sensor or repeated false warnings from the sensor. For example, the dynamically self-adjusting sensor may be an acoustic sensor monitoring a manufacturing machine for a deficiency such as a noise generated by a failing bearing. In one embodiment, once placed, the sensor will establish a baseline for the acoustic signature of the manufacturing machine in operation. The sensor will then continue to monitor the machine in operation. If a bearing in the machine begins to fail, a new acoustic signature would be emitted and the sensor, recognizing the change in the acoustic signature, will provide a possible event message.

However, the sensor will also continue to monitor the acoustic signature over time to determine if the change in the acoustic signature had disappeared, remained the same, or had changed further.

In one embodiment, if the change in the acoustic signature disappears, the sensor would be able to provide additional details about the possible event, e.g., duration, delta change, and the like. Similarly, if the acoustic signature had changed further, in one embodiment the sensor would be able to provide another possible event message. Again, the possible event message may include duration, delta change, and the like.

However, in another embodiment, if the acoustic signature remains at the new acoustic signature level, after providing at least the initial possible event message the dynamically self-adjusting sensor, over a period of time, will adjust its baseline to reflect the new acoustic signature level as the new baseline.

In other words, the dynamic self-adjusting characteristics allow the dynamically self-adjusting sensor to adjust to changes in the environment. Moreover, these changes may be specific to the thing being monitored or may be generic to the environment around whatever is being monitored. For example, if a second machine begins operating next to the monitored machine, the event would be detected and the possible event notification would be provided. However, if the machine continues to operate next to the monitored machine, by dynamically self-adjusting to the new acoustic signature, the sensor is able to update the baseline to the now different acoustic characteristics. In other words, over time, or by manual update directive, the operation of the second machine will become part of the expected acoustic signature instead of a possible event outside of the normal. In so doing, the sensitivity of the sensor will not be compromised by changes in the environment. Further, since the sensor is dynamically self-adjusting the sensitivity levels can also be within a smaller window than a non-dynamically self-adjusting sensor.

Another monitored environment example may include monitoring a water based building fire suppression system. The dynamically self-adjusting sensor may be utilized to monitor the pipes for leaks, lack of flow-through, changes in flow rates, or other characteristics that may be utilized to ensure the fire suppression system is either in working order or in need of repair.

The self-calibrating capability described herein, also works with other types of sensors including, but not limited to optical, magnetic, and the like.

Monitored Environment

Figure 1:
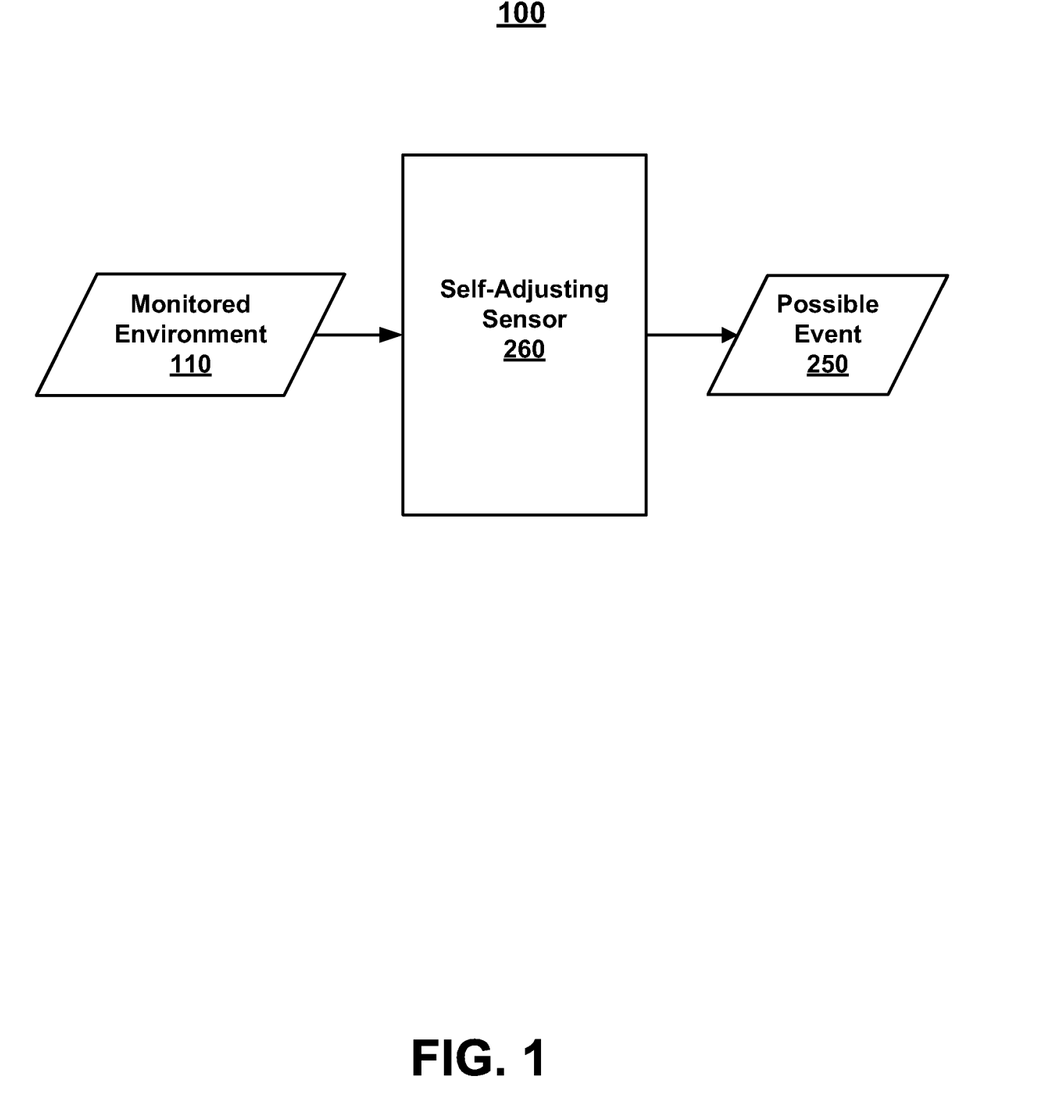
FIG. 1 is a block diagram of one embodiment for monitoring a magnetic field in an environment is shown.

With reference to FIG. 1, a block diagram 100 of one embodiment for monitoring an environment is shown. In one embodiment, FIG. 1 includes a monitored environment 110, a dynamically self-adjusting sensor 260 and a possible event 250.

In general, monitored environment 110 may be natural or man-made. In one embodiment, the monitored environment 110 is a localized area or portion of an environment, similar to an ecosystem. For example, monitored environment 110 may be an outdoor area, an indoor area, or a combination thereof. For example, monitored environment 110 could be a building, a room, a piece of machinery, a pipeline, a yard, a pool, or the like that a user would want monitored. Additionally, part or all of monitored environment 110 may be dry, partially or completely submerged, partially or completely buried, and the like.

Usually, monitored environment 110 will have a certain baseline for any given period of time. However, it is not uncommon for the baseline of a monitored environment 110 to change over time. Generally, baseline changes in monitored environment 110 can be changes that occur over a longer period of time than a possible event change. For example, a possible event change in monitored environment 110 due to a failing bearing may occur over a period of seconds while a baseline change in monitored environment 110 may be a second machine beginning operation. Thus, while initially labeled as a possible event 250, after a period of time, such as a minute, hour or the like, depending on a sensor setting or the like, the second machine's operation will become absorbed and part of the expected baseline.

Similarly, a baseline change may be a repetitive event. For example, every ten minutes, a fan may turn on for one minute to generate a flow of air. While initially recognized as a possible event 250, over time, the baseline may be dynamically adjusted to expect the repetitive operation of the fan. In so doing, it is recognized that the dynamically self-adjusting sensor is also well suited to monitoring repetitive on or off events. For example, to monitor the operation of the fan and provide a possible event 250 if a pre-defined number of time periods have passed without the dynamically self-adjusting sensor 260 "hearing" the fans expected operation. In another example, a possible event 250 may be provided if the time period for the repetitive operation of the fan changes. Although an example herein utilizes a repetitive event that is every ten minutes, the repetitive event may be, slower or longer in duration. For example, the repetition may be hourly, daily, weekly, monthly, or the like. In other words, the dynamically self-adjusting sensor 260 is capable of establishing a baseline that may be scaled to account for the event to be monitored.

Dynamically self-adjusting sensor 260 monitors monitored environment 110 to recognize an event. When dynamically self-adjusting sensor 260 identifies a change in monitored environment 110 due to an event, possible event 250 is generated. In one embodiment, dynamically self-adjusting sensor 260 utilizes a relative change methodology instead of explicit field strength values of monitored environment 110.

In one embodiment, self-adjusting sensor 260 is powered by means of an electrical power source. This electrical power source may comprise an internal power source, such as a system battery, or an external power source, such as a transmission line that delivers alternating current and that may be accessed through an electrical wall socket. The description of a number of power sources is provided for purposes of clarity; however, the possible power sources may be other electrical types, chemical based, solar based or the like. Thus, the technology is well suited to alternate powering methods in accordance with the present invention. Further, the sensor described herein may be small and portable, e.g., reduced power requirements possibly having a shorter range; larger vehicle deployed, e.g., increased power requirements, thereby increasing the range; or may be hard mounted, such as on or in a building or other structure. In one embodiment, dynamically self-adjusting sensor 260 may be selectively powered up and selectively powered-down to extend battery life.

Dynamically Self-Adjusting Sensor

Figure 2:
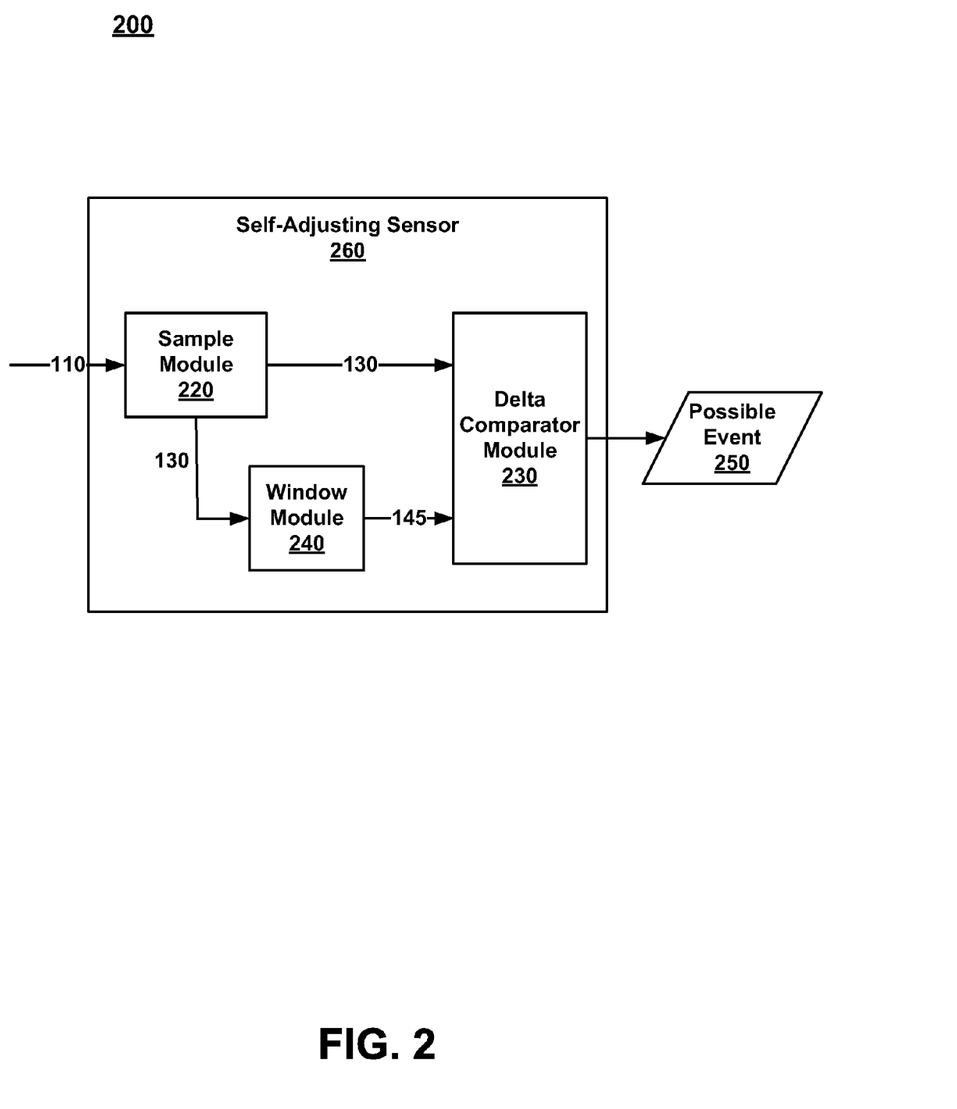
FIG. 2 is a block diagram of a dynamically self-adjusting sensor shown in accordance with one embodiment of the present technology.

With reference now to FIG. 2, a block diagram 200 of a self-adjusting sensor 260 is shown in accordance with one embodiment. In one embodiment, dynamically self-adjusting sensor 260 includes a sample module 220, delta comparator module 230, and window module 240.

As stated herein, self-adjusting sensor 260 may be, but is not limited to, an optical sensor, a magnetic sensor, an acoustic sensor, and the like.

In one embodiment, sample module 220 samples monitored environment 110 periodically at a pre-defined rate of time and generates a corresponding signal 130 for each sampling period. In one embodiment, signal 130 may be generated at a consistent interval. For example, sample module 220 may generate a new signal 130 every few milliseconds, few minutes, few seconds, few hours or the like. By adjusting the signal interval for sample module 220, both sensitivity and range of dynamically self-adjusting sensor 260 may be adjusted.

For example, sample module 220 may use a 1 MHz crystal to establish a nanosecond sample rate. In one embodiment, sample module 220 outputs a signal 130 to delta comparator module 230. In addition, sample module 220 also outputs a signal 130 to window module 240 and delta comparator module 230.

Referring still to FIG. 2, in one embodiment, window module 240 provides an average signal 145 over a pre-defined number of signals 130. The average signal 145 is provided to delta comparator module 230 and is utilized by delta comparator module 230 to detect changes in monitored environment 110.

In one embodiment, delta comparator module 230 receives signal 130 from sample module 220 and compares the new signal 130 with a previous signal 130. For example, after delta comparator module 230 receives at least a second signal 130, delta comparator module 230 will compare the two signals 130 and generate a delta or difference between the two signals, as shown and described in more detail in FIGS. 4-5 herein. Thus, since in one embodiment, delta comparator module 230 performs a comparison between the most recent signal 130 and the next most recent signal 130, a dynamically self-adjusted baseline for the particular monitored environment 110 is maintained. Further, since signal 130 is compared with another signal 130 and the change is utilized, the delta value generated by delta comparator module 230 may be a relative value. As such, an explicit value for the signal 130 is not required. When the resultant difference between compared signals 130 is greater than or equal to a pre-defined difference threshold, delta comparator module 230 provides a possible event 250 output.

With respect to average signal 145, in one embodiment, delta comparator module 230 receives average signal 145 from window module 240 and compares average signal 145 with a previous average signal 145. For example, after delta comparator module 230 receives at least a second average signal 145, delta comparator module 230 will compare the two average signals 145 and generate a delta or difference between the two average signals 145, as shown and described in more detail in FIGS. 4-5 herein. Again, since average signal 145 is compared with another average signal 145 and the change is utilized, the delta value generated by delta comparator module 230 may be a relative value. As such, an explicit value for average signal 145 is not required. When the resultant delta between either signals 130 and/or average signals 145 is greater than or equal to a pre-defined difference threshold, delta comparator module 230 outputs a tangible, concrete possible event 250. Examples of an output of possible event 250 include, but are not limited to, a printout, a visual and/or audio signal, an output to a graphical user interface (GUI), or the like.

Although, in one embodiment, neither signal 130 nor average signal 145 need include a specific or quantified value for monitored environment 110 as long as sample module 220 provides a consistent representation of monitored environment 110 in signal 130. However, in another embodiment, signal 130 and/or average signal 145 may include a specified value related to monitored environment 110.

In one embodiment, delta comparator module 230 may monitor a plurality of average signals 145 over time to detect changes in monitored environment 110 over time. In yet another embodiment, the functions described herein as being performed by a single delta comparator module 230 may be performed by more than one delta comparator module 230 or may be performed by the same device that performs the operations of sample module 220 and/or window module 240. However, for purposes of clarity, block comparator 230 is shown as a single module and is described herein as separate from sample module 220 and window module 240.

Operation

Figure 3:
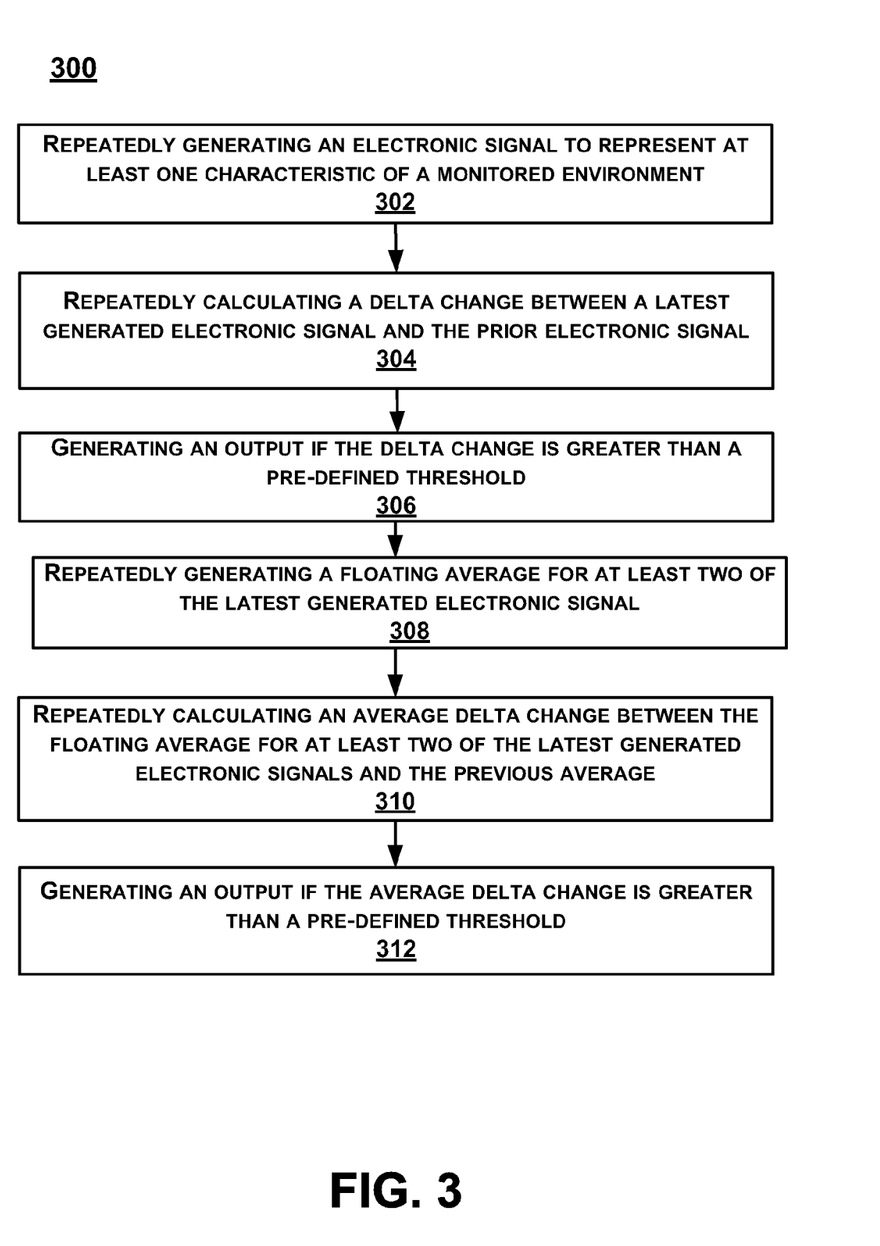
FIG. 3 is a flowchart of an exemplary method for monitoring an environment with a dynamically adjustable sensor in accordance with one embodiment of the present technology.
Figure 4:
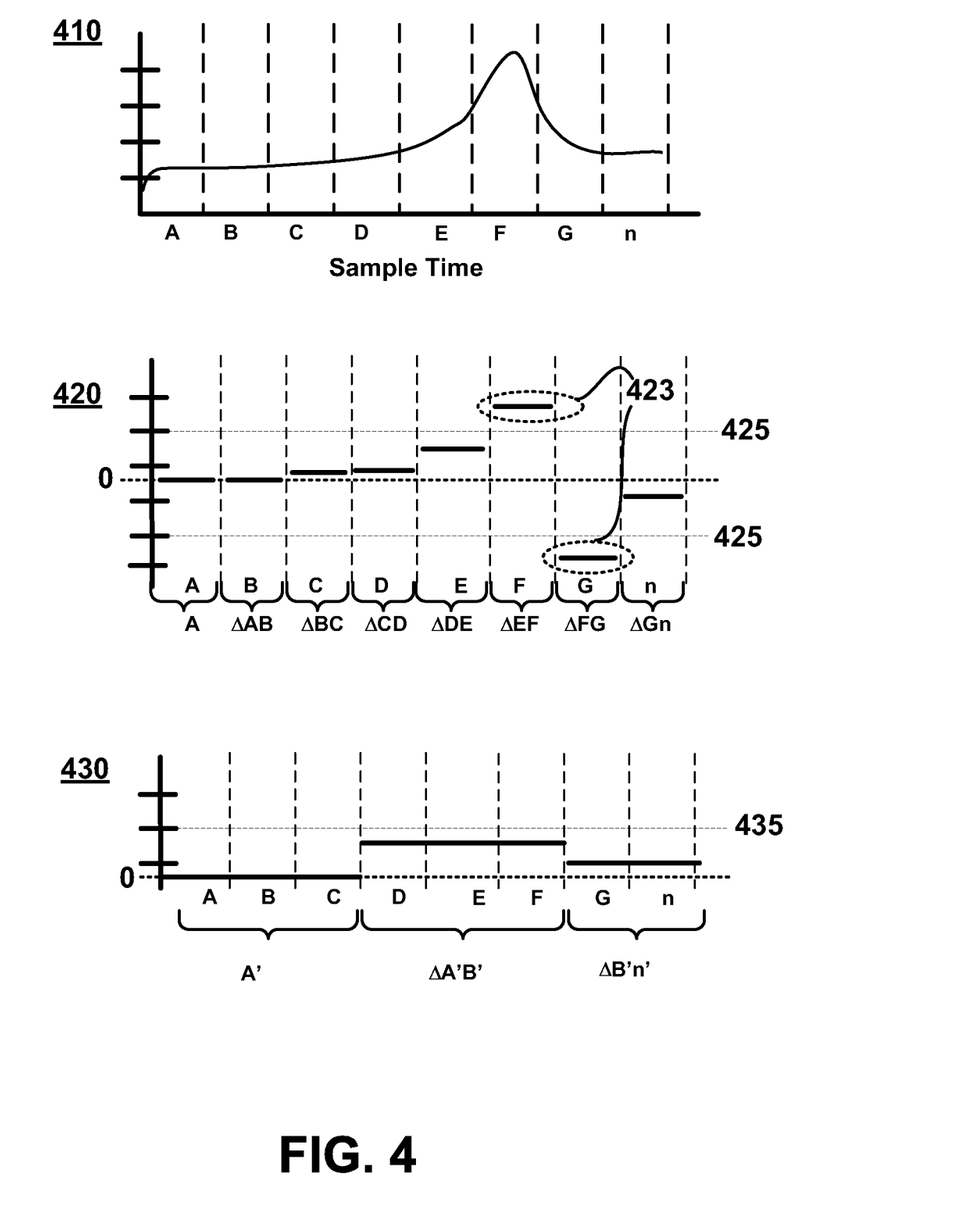
FIG. 4 is a plurality of graphs 410-430 illustrating one embodiment for monitoring an environment with a dynamically adjustable sensor in accordance with one embodiment of the present technology.
Figure 5:
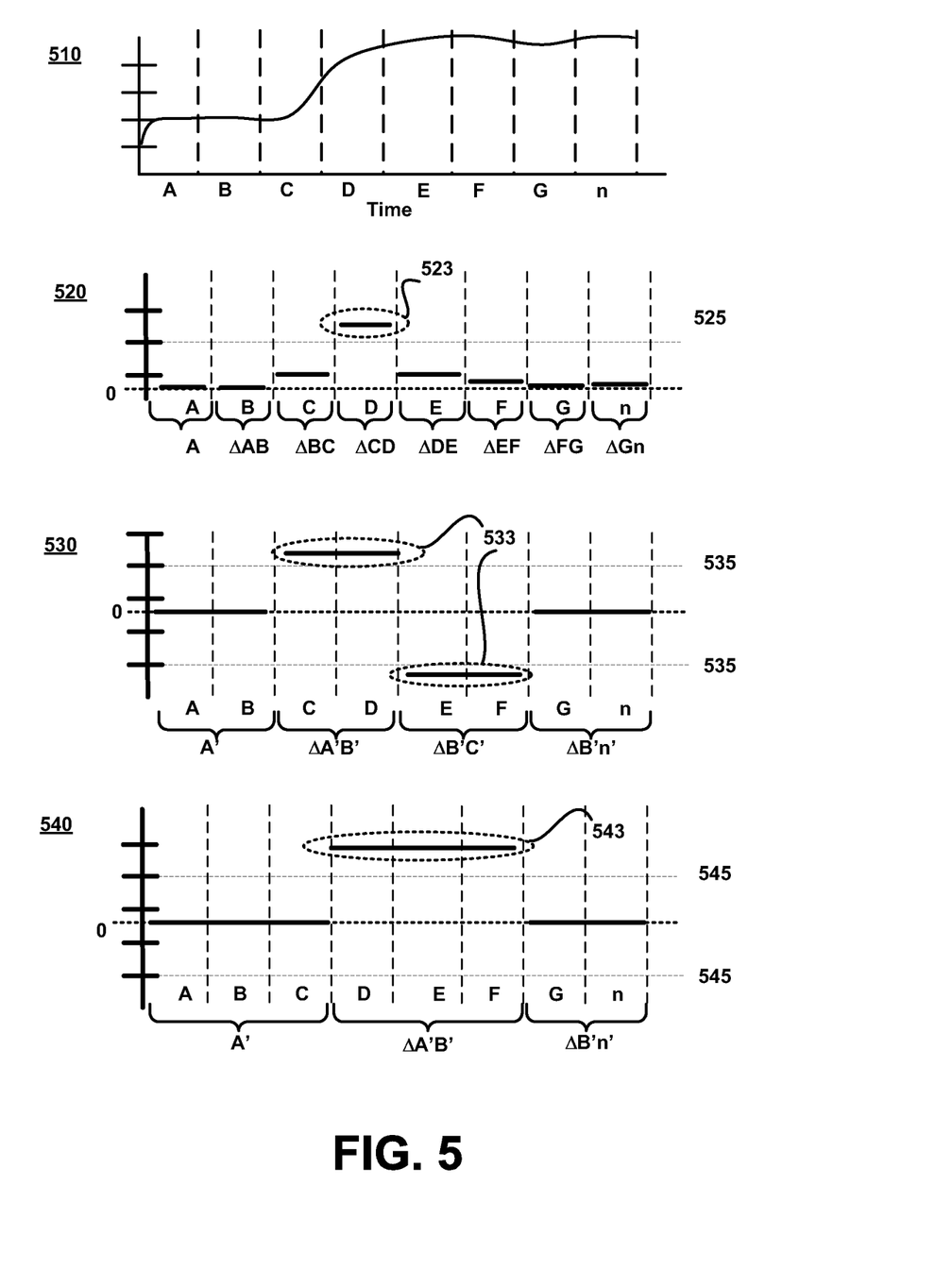
FIG. 5 is a plurality of graphs 510-540 illustrating another embodiment for monitoring an environment with a dynamically adjustable sensor in accordance with one embodiment of the present technology.

With reference now to FIG. 3, a flowchart 300 of one method for monitoring an environment with a dynamically self-adjusting sensor 260 is shown in accordance with one embodiment. For clarity in the following description, graphs 410-430 of FIG. 4 and graphs 510-540 of FIG. 5 are utilized in conjunction with Flowchart 300 to illustrate a number of the plurality of possible embodiments. At graph 410 of FIGS. 4 and 510 of FIG. 5 a characteristic of monitored environment 110 is shown over time period A-n. The characteristic may be an acoustic characteristic, visual characteristic, infrared characteristic, or the like.

In general, graph 410 is an example of at least one characteristic of monitored environment 110 as occurring over a time A-n. In the following examples, A-n are described as sample times. In other words, in one embodiment described herein, during each of time A-n sample module 220 generates a signal 130. As is apparent in graph 410, a small change occurs between times A-D and then a large change occurs between times E-G with a peak at time F. At time n, the characteristics of monitored environment 110 appear to return to the level prior to the spike at F. Thus, graph 410 may be an example of an event that showed up and then went away. The event could be a single event, or graph 410 may represent a single snippet of a repetitive event.

In one embodiment, graph 510 is an example of at least one characteristic of monitored environment 110 as occurring over a time A-n. In the following examples, A-n are described as sample times. In other words, in one embodiment described herein, during each of time A-n sample module 220 generates a signal 130. As is apparent in graph 510, little change occurs between times A-B and then a large change occurs between times C-D with a peak at time E that results in a leveling off of the characteristic at times E-n. At time n, the characteristics of monitored environment 110 appear to be stable at the new level. Thus, graph 510 may be an example of an event that showed up and then remained. Again, in one embodiment, the event could be a single event, or graph 510 may represent a single snippet of a repetitive event.

At 302 of FIG. 3, one embodiment repeatedly generates a signal 130 representing at least one characteristic of monitored environment 110. In one embodiment, signal 130 is generated by sample module 220 of FIG. 2.

With reference now to 304 of FIG. 3 as well as graph 420 of FIGS. 4 and 520 of FIG. 5, one embodiment repeatedly calculates a delta change between a latest generated electronic signal 130 and the prior electronic signal 130. In other words, delta comparator module 230 receives signal 130 from sample module 220 and compares the new signal 130 with a previous signal 130. For example, after delta comparator module 230 receives at least a second signal 130, delta comparator module 230 will compare the two signals 130 and generate a delta or difference between the two signals, as shown in graphs 420 and 520. Thus, since in one embodiment, delta comparator module 230 performs a comparison between the most recent signal 130 and the next most recent signal 130, a dynamically self-adjusted baseline for the particular monitored environment 110 is maintained. Further, since signal 130 is compared with another signal 130 and the change is utilized, the delta value generated by delta comparator module 230 may be a relative value. As such, an explicit value for the signal 130 is not required.

For example, at graph 420 the change between A and B (ΔAB) samples is minimal. Similarly, the difference between ΔBC and ΔCD are also minimal However, the change at sample time E and the spike at sample time F clearly show up on graph 420 at ΔDE and ΔDF. Further, at ΔFG the end of the spike is also recognized while at ΔGn the spike appears to be gone and a baseline characteristic for monitored environment 110 appears to have returned.

In another example, at graph 520 the change between A and B (ΔAB) samples is minimal. Similarly, the difference between ΔBC is also minimal However, the change at sample time C and sample time D are clearly shown on graph 520 at ΔBC and ΔCD. At ΔDE the change in monitored environment 110 appears to stabilize and the characteristic for ΔEF, ΔFG and ΔGn show the lack of change in measured characteristics. Moreover, it is also noted that while the change may be provided in a positive and negative aspect such as shown in graph 420, absolute values for the differences may be used as shown in graph 520.

Referring now to 306 of FIG. 3, when the resultant difference between monitored environment 110 signals 130 is greater than or equal to a pre-defined difference threshold, dynamically self-adjusting sensor 260 provides a possible event 250 output. For example, at graph 420 the threshold value is shown as 425 and possible event 250 is output when the threshold is passed as illustrated at 423. Similarly, at graph 520 the threshold value is shown as 525 and possible event 250 is output when the threshold is passed as illustrated at 523.

With reference now to 308 of FIG. 3, one embodiment repeatedly generates a floating average for at least two of the latest generated electronic signals 130. For example, delta comparator module 230 receives a number of electronic signals 130 from sensor 220 over a given period of time and averages the signals 130 for that time period.

For example, delta comparator module 230 may average signals 130 over a group of three sample time periods to generate average signal 145. In another embodiment, delta comparator module 230 may average received signals 130 over a 5 minute, 20 minute, 1 hour, 2 hour, 6 hour, 12 hour, 24 hour, etc. time period before generating average signal 145. In one embodiment, the length of time represented by average signal 145 may be directly related to the sensitivity and/or range of dynamically self-adjusting sensor 260.

With reference now to 310 of FIG. 3 as well as graph 430 of FIGS. 4 and 530 and 540 of FIG. 5, one embodiment repeatedly calculates an average delta change between the floating average signal 145 for at least two of the latest generated electronic signals 130 and the previous average signal 145. In one embodiment, floating average signal 145 refers to the methodology of averaging the signals 130. For example, if the floating average signal was based on the average of three signals, then the first average would be the average of signal A+signal B+signal C. However, the next floating average signal may be the average of signal B+Signal C+Signal D. Thus, although in some embodiments herein, for purposes of clarity, the averaging is per set of signals, the present technology is well suited to floating averages as well as block averages.

For example, as shown in graph 430 and 530, in one embodiment, delta comparator module 230 looks at the difference or change between average signal 145 A' and ΔA'B'. In one embodiment, as shown in 430 the sensitivity of dynamically self-adjusting sensor 260 is not affected by the direction of a change in strength of monitored environment 110. In other words, the resultant change may be an absolute value of the change (e.g., as shown in 430). In another embodiment, the resultant change may maintain its direction of change characteristic such as shown in 530 of FIG. 5.

By utilizing a difference comparison between signal 130 and similarly average signal 145, changes that occur in monitored environment 110 can be normalized to provide sensitivity for dynamically self-adjusting sensor 260. For example, if monitored environment 110 varies naturally over time, such as can occur during changes in the daily temperature, other machine noise, or the like, because the relative change is evaluated, monitored environment 110 variations may prompt an initial possible event 250, however if the event remains or becomes periodic, dynamically self-adjusting sensor 260 will dynamically adjust as shown in ΔA'B' and ΔB'n' of 430. In so doing, dynamically self-adjusting sensor 260 can be set to and will remain at a consistent and very high level of sensitivity. In one embodiment, the operational sensitivity of dynamically self-adjusting sensor 260 may be less than or equal to the natural variations in the environment's monitored environment 110.

When comparing graphs 420 and 430, it is clear that having a differing window size can affect the reaching of the threshold value. For example, although they represent the same monitored environment 110 characteristics. While the threshold 425 of graph 420 is breached at 423 causing a possible event 250, the threshold 435 of graph 430 is not breached. Thus, it is clear that sensitivity and false warnings may be dealt with by adjusting the window size of average signal 145. Further, although only one average signal 145 graph is shown at 430 (and only 2 are shown at 530 and 540), the present technology is well suited to having a plurality of window sizes. Further, the present technology is well suited to having a plurality of window sizes operating at the same time to obtain numerous levels of sensitivity.

In other words, the utilization of window module 240 as well as sample module 220 allows dynamically self-adjusting sensor 260 to maintain numerous levels of sensitivity to changes in monitored environment 110 at the same time. Thus, in one embodiment, by utilizing both sample module 220 and one or more window module 240, dynamically self-adjusting sensor 260 can have both a high level of sensitivity as well as a large field of range.

Referring now to 312 of FIG. 3, one embodiment generates a possible event 250 output when a difference in the comparing is greater than a threshold. For example, possible event 250 at 533 of graph 530 and possible event 250 at 543 of graph 540. In one embodiment, possible event 250 may be an audible mechanical and/or visual alarm configured to be heard by a human being. In an alternative embodiment, possible event 250 may be sent via a communication network to automatically notify designated personnel when an event is detected.

In another embodiment, possible event 250 may be received by another device that will carry out a follow-on task. For example, possible event 250 could provide a turn-on signal for one or more lights, such a light located in the vicinity of the detected event. Additionally, possible event 250 could include a signal to generate a notification of the detected event to a remote location. In one embodiment, possible event 250 may initiate an automatic action.

In one embodiment, dynamically self-adjusting sensor 260 wired or wirelessly transmits possible event 250 to a remote communications device by implementing a communication technology selected from a group of communication technologies consisting of AM, FM, multi-master serial single-ended computer bus such as Inter-Integrated Circuit (I$^2$C), PCM, GPS, RS232, RS485, USB, firewire, infrared and fiber optic communication technologies, and the like. The description of a number of communication technologies is provided herein for purposes of clarity; however, the technology is well suited to alternate communication methods in accordance with the present invention.

Moreover, dynamically self-adjusting sensor 260 is capable of operation in both an attended state and an unattended state. For example, dynamically self-adjusting sensor 260 is well suited to be placed in an environment that is constantly supervised, such as in a building, around machinery or the like. In another embodiment, dynamically self-adjusting sensor 260 is able to be "dropped" into an area to act as a standalone environment monitor. For example, dynamically self-adjusting sensor 260 may be placed in a location such as a closed hallway, off-limits area, or other environment that may be secluded or dangerous for human monitoring, and the like. In one embodiment, during operation in an unmanned operating environment, possible event 250 from dynamically self-adjusting sensor 260 may be communicated to a remote site.

Dynamically self-adjusting sensor 260 may also be expanded to include data storage for various purposes. For instance, in an embodiment, signal 130, average signal 145 and/or information generated by sample module 220, window module 240 and delta comparator module 230 may be stored in a storage unit such that the data may be subsequently retrieved and further processed. For example, a hard disk drive (HDD) or random access memory (RAM) is used to electronically store the data by means of arrays of electronic capacitors that are configured to acquire an electronic charge, wherein the charging of the capacitor arrays corresponds to a digital representation of the acquired data. However, it is understood that the aforementioned examples are merely exemplary of different storage units that may be implemented pursuant to various embodiments of the present technology. Other suitable storage units may also be utilized to store data such that it may be later accessed and processed. For instance, a portable flash drive may be used to store data, and the flash drive could be physically transported from a first computing system to a second computing system, wherein both computing systems are capable of accessing data stored on the drive.

Example Computing System

Figure 6:
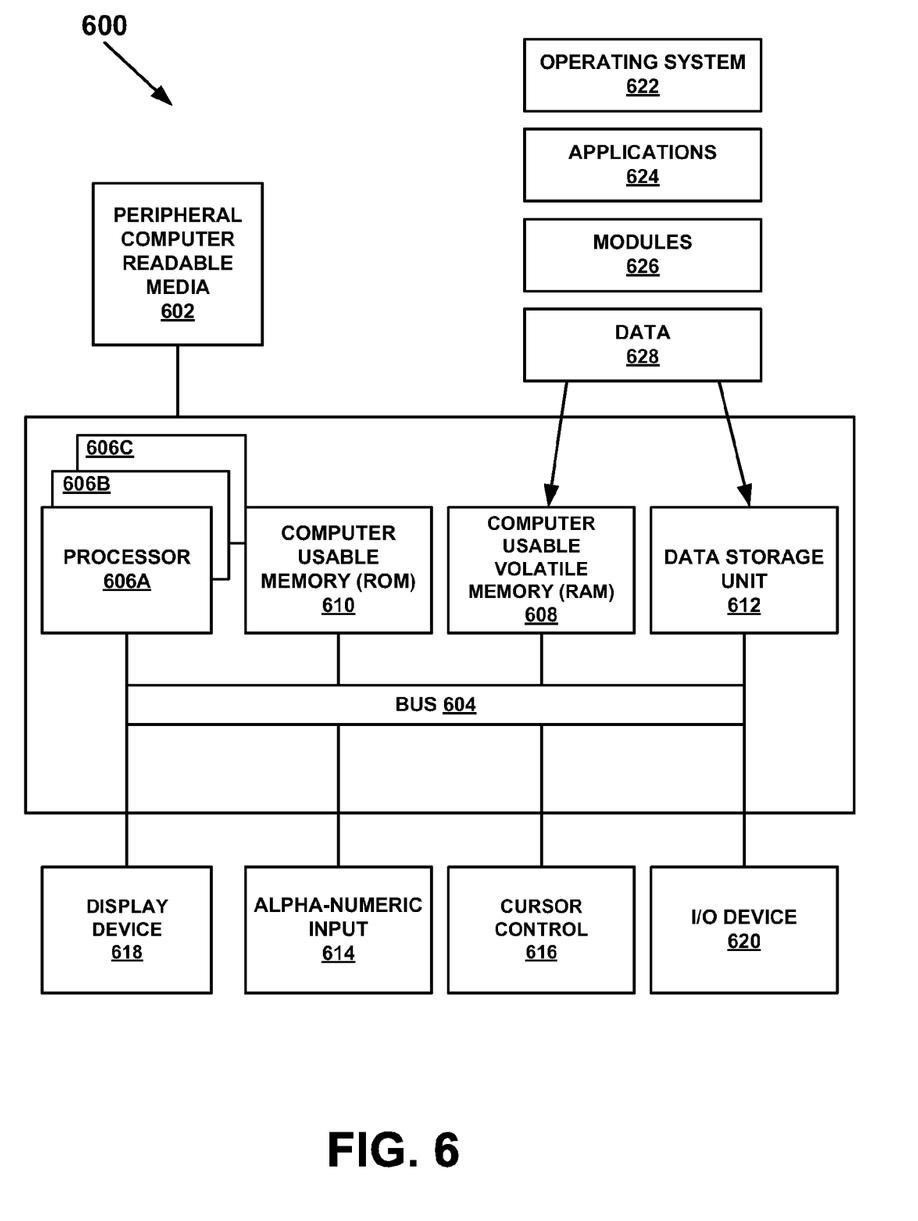
FIG. 6 is a block diagram of an exemplary computer system in accordance with one embodiment of the present technology.

With reference now to FIG. 6, portions of the technology may be composed of computer-readable and computer-executable instructions that reside, for example, on computer-usable media of a computer system. FIG. 6 illustrates an example of a computer system 600 that can be used in accordance with embodiments of the present technology. However, it is appreciated that systems and methods described herein can operate on or within a number of different computer systems including general purpose networked computer systems, embedded computer systems, routers, switches, server devices, client devices, various intermediate devices/nodes, standalone computer systems, and the like. For example, as shown in FIG. 6, computer system 600 is well adapted to having peripheral computer readable media 602 such as, for example, a floppy disk, a compact disc, flash drive, back-up drive, tape drive, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g. random access memory (RAM) (e.g., static RAM, dynamic, RAM, etc.) coupled to bus 604 for storing information and instructions for processors 606A, 606B, and 606C. System 600 also includes computer usable non-volatile memory 610, e.g. read only memory (ROM) (e.g., read only memory, programmable ROM, flash memory, EPROM, EEPROM, etc.), coupled to bus 604 for storing static information and instructions for processors 606A, 606B, and 606C. Also present in system 600 is a data storage unit 612 (e.g., a magnetic or optical disk and disk drive, solid state drive (SSD), etc.) coupled to bus 604 for storing information and instructions.

System 600 also includes an alphanumeric input device 614 including alphanumeric and function keys coupled to bus 604 for communicating information and command selections to processor 606A or processors 606A, 606B, and 606C. System 600 also includes a cursor control device 616 coupled to bus 604 for communicating user input information and command selections to processor 606A or processors 606B, and 606C. System 600 of the present embodiment also includes a display device 618 coupled to bus 604 for displaying information. In another example, alphanumeric input device 614 and/or cursor control device 616 may be integrated with display device 618, such as for example, in the form of a capacitive screen or touch screen display device 618.

Referring still to FIG. 6, optional display device 618 of FIG. 6 may be a liquid crystal device, cathode ray tube, plasma display device or other display device suitable for creating graphic images and alphanumeric characters recognizable to a user. Cursor control device 616 allows the computer user to dynamically signal the movement of a visible symbol (cursor) on a display screen of display device 618. Many implementations of cursor control device 616 are known in the art including a trackball, mouse, touch pad, joystick, capacitive screen on display device 618, special keys on alpha-numeric input device 614 capable of signaling movement of a given direction or manner of displacement, and the like. Alternatively, it will be appreciated that a cursor can be directed and/or activated via input from alpha-numeric input device 614 using special keys and key sequence commands. System 600 is also well suited to having a cursor directed by other means such as, for example, voice commands, touch recognition, visual recognition and the like. System 600 also includes an I/O device 620 for coupling system 600 with external entities. For example, in one embodiment, I/O device 620 enables wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612.

Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for monitoring an environment with a dynamically adjustable sensor, said method comprising:
   repeatedly generating an electronic signal to represent at least one characteristic of a monitored environment;
   calculating a delta change between a latest generated electronic signal and the prior electronic signal;
   generating an output if said delta change is greater than a pre-defined threshold;
   repeatedly generating a first floating average for at least two of the latest generated electronic signal;
   calculating an average delta change between the first floating average for at least two of the latest generated electronic signals and the previous average;
   repeatedly generating a second floating average for at least two of the latest generated electronic signal to provide a second floating average signal for a pre-defined number of said electronic signals, said second floating average signal utilizing a different number of said electronic signals than said first floating average signal; and
   generating an output if the average delta change is greater than a pre-defined threshold.

2. The computer-implemented method of claim 1, wherein said repeatedly generating an electronic signal is performed by a sensor selected from the group consisting of: an optical sensor, a magnetic sensor and an acoustic sensor.

3. The computer-implemented method of claim 1 further comprising:
   utilizing a relative value for calculating said delta change and said average delta change.

4. The computer-implemented method of claim 1 further comprising:
   generating said output if said delta change is equal to a pre-defined threshold; and
   generating said output if the average delta change is equal to a pre-defined threshold.

5. The computer-implemented method of claim 1 further comprising:
   utilizing an absolute value of the delta change and the average delta change.

6. The computer-implemented method of claim 1 wherein the output is selected from the group consisting of: a printout, a visual signal, an audio signal, and an output to a graphical user interface (GUI).

7. A dynamically self-adjusting sensor comprising:
   a sample module for repeatedly generating an electronic signal related to at least one characteristic of a monitored environment;
   a window module to receive said electronic signal from said sample module and to provide an average signal for a pre-defined number of said electronic signals;
   at least a second window module to receive said electronic signal from said sample module and to provide a second average signal for a pre-defined number of said electronic signals, said second average signal having a different pre-defined number of said electronic signals than said first average signal; and
   a delta comparator module for receiving said electronic signal from said sample module and comparing said electronic signal with a previously received electronic signal from said sample module to establish a change, wherein an output is generated if the change is greater than or equal to a threshold, said delta comparator module further receiving said average signal from said window module and comparing said average signal with a previously received average signal from said window module to establish an average change, wherein said output is generated if the change is greater than or equal to a threshold.

8. The dynamically self-adjusting sensor of claim 7, wherein said sensor is selected from the group consisting of: an optical sensor, a magnetic sensor and an acoustic sensor.

9. The dynamically self-adjusting sensor of claim 7, wherein said comparing at the delta comparator module provides a dynamically self-adjusted monitored environment.

10. The dynamically self-adjusting sensor of claim 7, wherein an explicit value is provided for said electronic signal related to at least one characteristic of a monitored environment.

11. The dynamically self-adjusting sensor of claim 7, wherein the change established by said delta comparing module does not require an explicit value for said electronic signal related to at least one characteristic of a monitored environment.

12. The dynamically self-adjusting sensor of claim 7, wherein said at least one characteristic of a monitored environment is an operating device.

13. The dynamically self-adjusting sensor of claim 7, wherein said at least one characteristic of a monitored environment is generic to an environment around an operating device.

14. The dynamically self-adjusting sensor of claim 7, wherein the output is selected from the group consisting of: a printout, a visual signal, an audio signal, and an output to a graphical user interface (GUI).

15. Instructions on a computer-usable medium wherein the instructions when executed cause a computer system to perform a method for monitoring an environment with a dynamically adjustable sensor, said method comprising:
   repeatedly generating an electronic signal to represent at least one characteristic of a monitored environment;
   calculating a delta change between a latest generated electronic signal and the prior electronic signal;
   generating an output if said delta change is greater than or equal to a pre-defined threshold;
   repeatedly generated electronic signal; and
   repeatedly generating a second floating average for at least two of the latest generated electronic signal to provide a second floating average signal for a pre-defined number of said electronic signals, said second floating average signal utilizing a different number of said electronic signals than said first floating average signal.

16. The computer-usable medium of claim 15 further comprising:
   calculating an average delta change between the first floating average for at least two of the latest generated electronic signals and the previous average; and
   generating an output if the average delta change is greater than a pre-defined threshold.

17. The computer-usable medium of claim 15 wherein said repeatedly generating an electronic signal is performed by a sensor selected from the group consisting of: an optical sensor, a magnetic sensor and an acoustic sensor.

18. The computer-usable medium of claim 15 wherein the output is selected from the group consisting of: a printout, a visual signal, an audio signal, and an output to a graphical user interface (GUI).

* * * * *